July 29, 1952     E. K. BENEDEK     2,604,951
HYDRAULIC PROPELLER PITCH CHANGE MECHANISM
Original Filed May 24, 1941     7 Sheets-Sheet 1
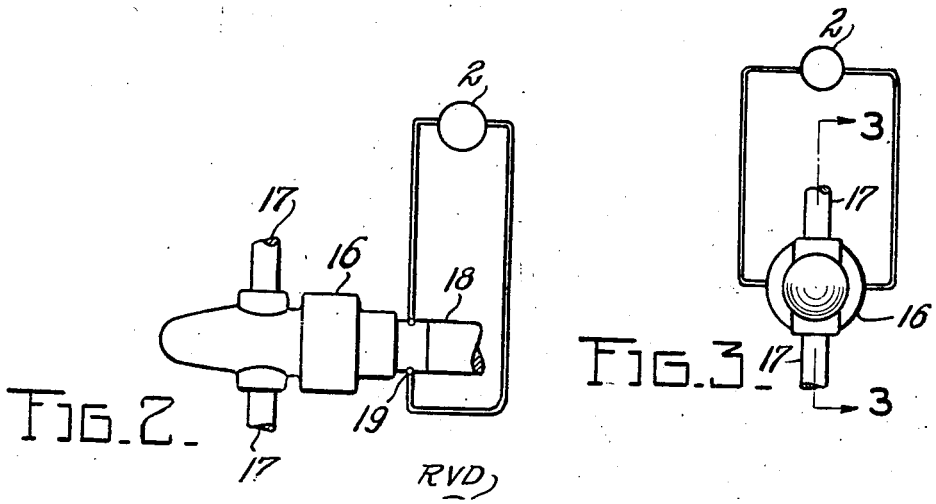
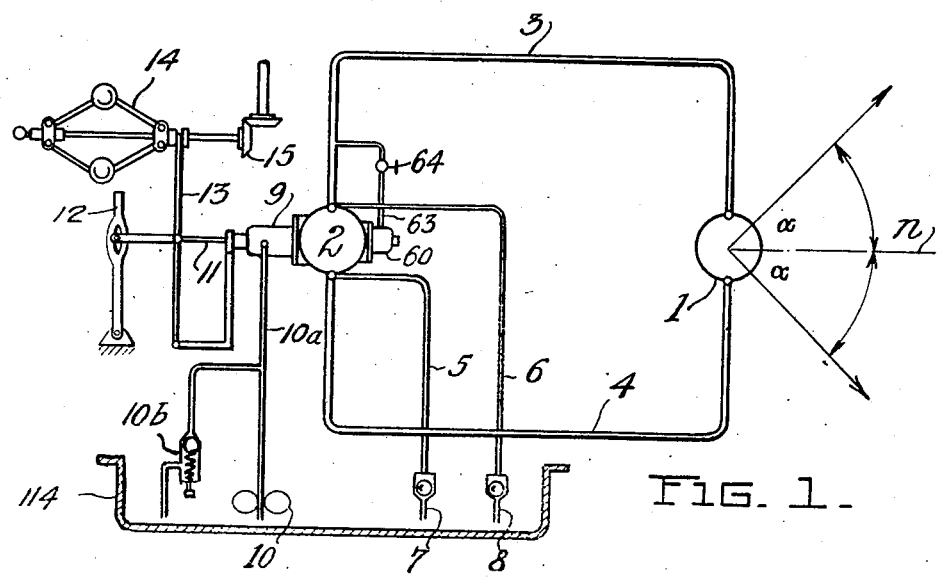
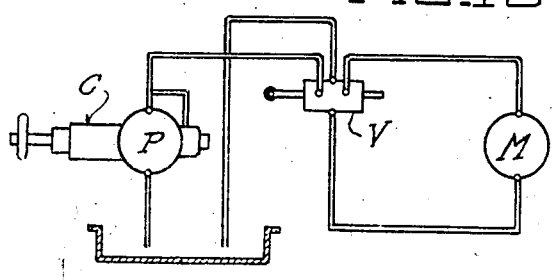
INVENTOR.
ELEK K. BENEDEK.
BY Baldwin & Wight
his ATTORNEYS

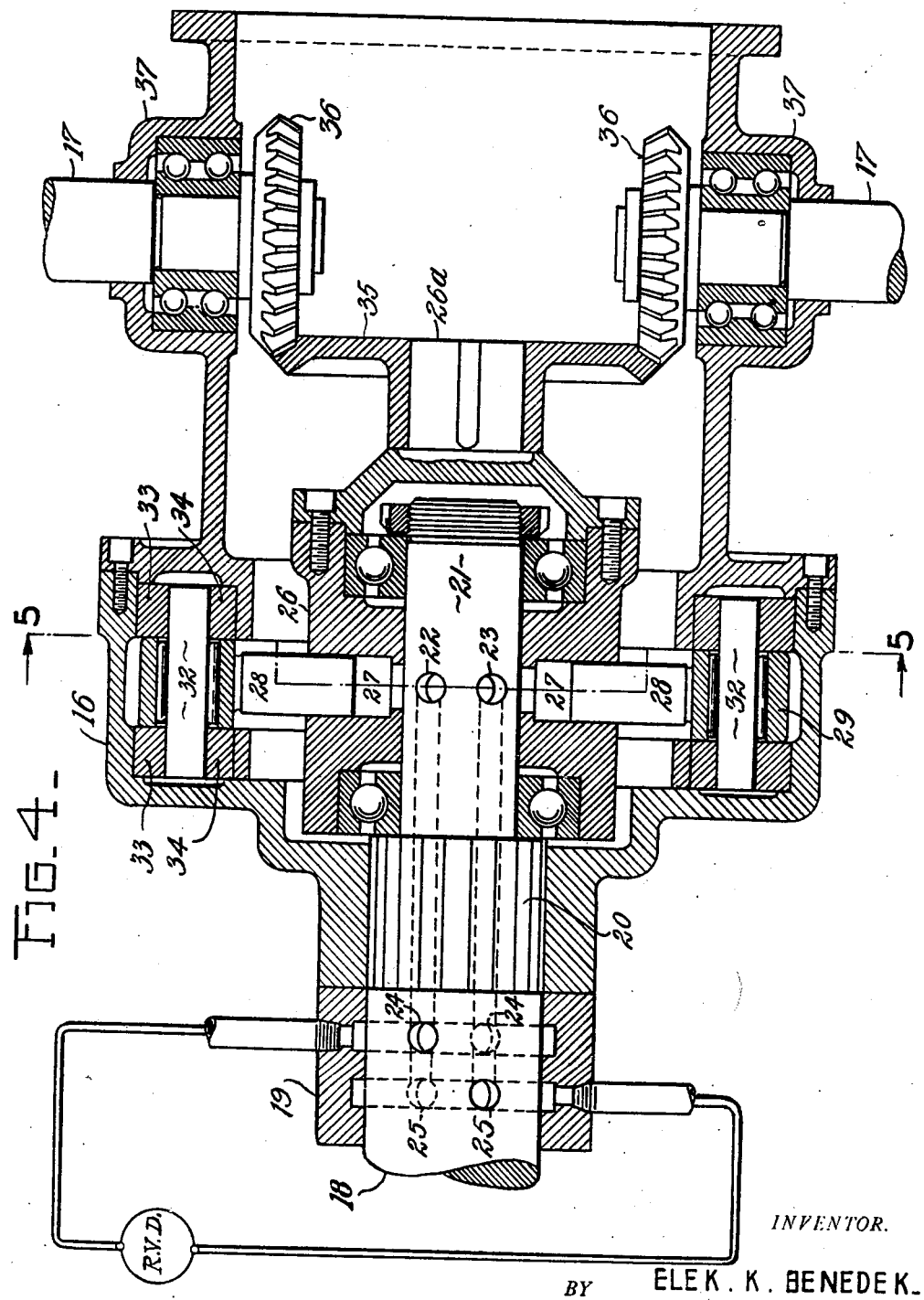

July 29, 1952

E. K. BENEDEK 2,604,951

HYDRAULIC PROPELLER PITCH CHANGE MECHANISM

Original Filed May 24, 1941

INVENTOR.
ELEK K. BENEDEK.
BY Baldwin & Wight
his ATTORNEYS

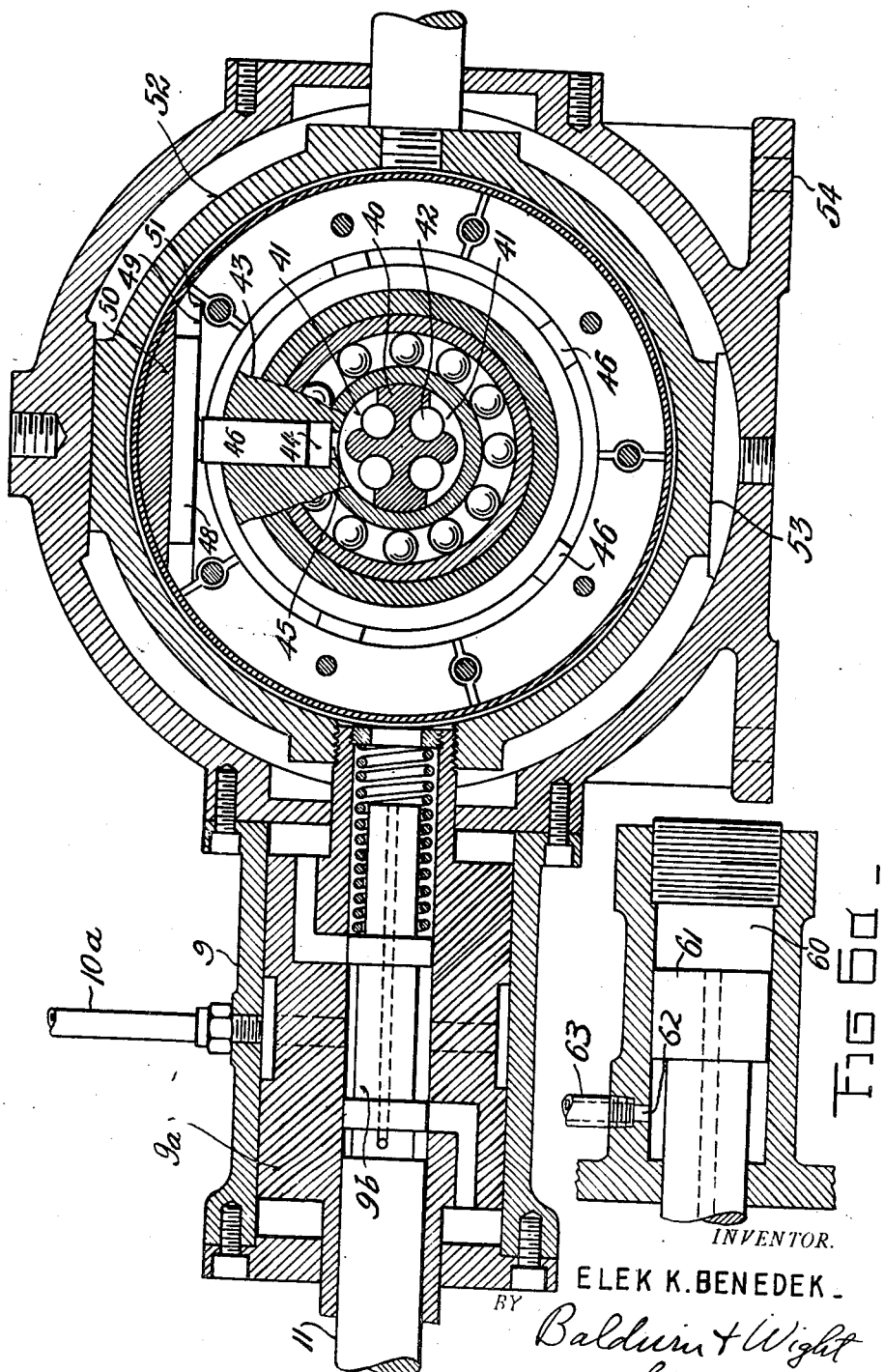

July 29, 1952  E. K. BENEDEK  2,604,951
HYDRAULIC PROPELLER PITCH CHANGE MECHANISM
Original Filed May 24, 1941  7 Sheets-Sheet 5
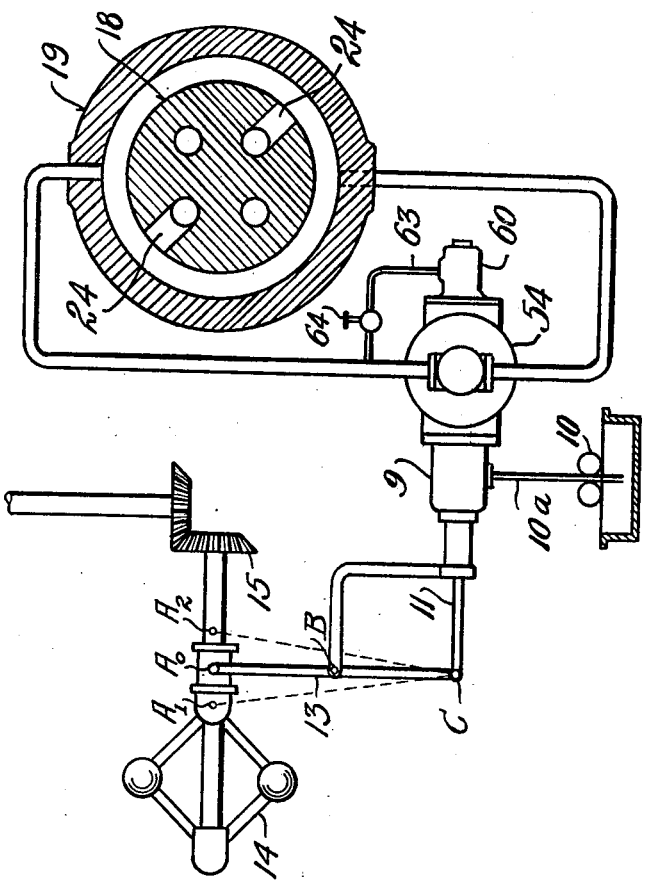
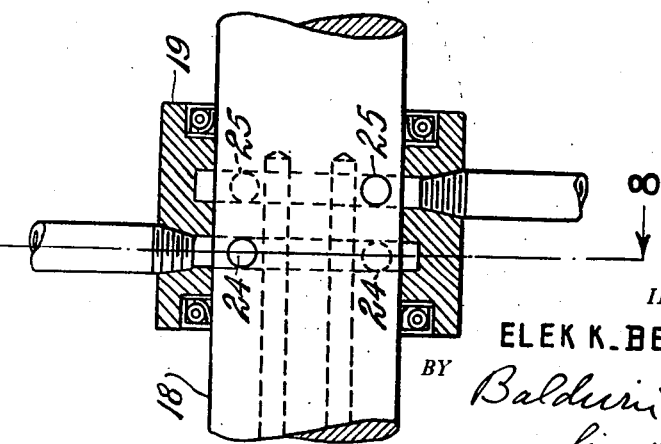
INVENTOR.
ELEK K. BENEDEK.
BY Baldwin & Wight
his ATTORNEYS

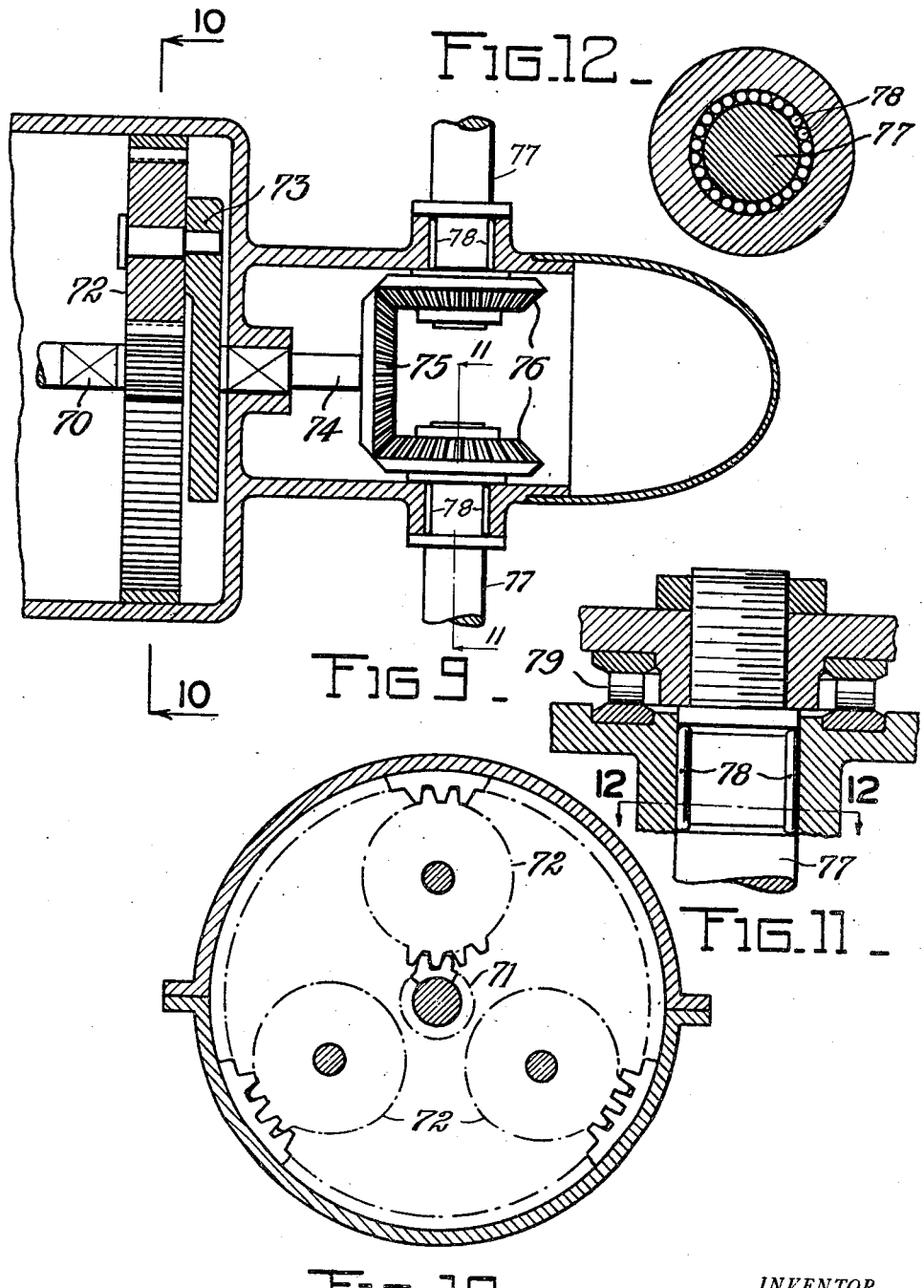

INVENTOR.
ELEK. K. BENEDEK
BY Baldwin + Wight
his ATTORNEYS

Patented July 29, 1952

2,604,951

UNITED STATES PATENT OFFICE 2,604,951

HYDRAULIC PROPELLER PITCH CHANGE MECHANISM

Elek K. Benedek, Chicago, Ill.

Original application May 24, 1941, Serial No. 395,080. Divided and this application August 13, 1945, Serial No. 610,536

10 Claims. (Cl. 170—160.2)

This application is a division of the copending application of Elek K. Benedek, Serial No. 395,080, filed May 24, 1941, which became U. S. Patent No. 2,382,389, issued August 14, 1945.

This invention relates to feathering variable pitch propellers, and particularly to a hydraulic mechanism for controlling the output of the engine by varying the pitch of airplane propeller blades.

Variable pitch propellers with limited means for angle control have been provided heretofore for use in connection with airplanes.

Originally the pitch was changed only between two limits, these limits being very little and of a maximum of 5° to 10°. The demands of the industry now require that the range of pitch adjustment be controlled steadily and positively and that "feathering" of the propeller be made possible. This is particularly true in connection with the growing tendency toward the use of power descents in airplanes.

It is one of the objects of the present invention to provide a propeller and pitch control mechanism therefor by which the propeller can be made to function as a constant speed propeller but with an increased range of blade pitch adjustment.

Another object is to provide a propeller and control mechanism by which the pitch of the propeller blades can be changed or adjusted in emergencies to a more nearly completely "feathered" position, that is, a position in which their chord is approximately parallel to the line of flight, so that the propeller blades act as brakes for reducing the engine rotation.

Another object is to provide for effecting this operation in relatively few seconds so that the engine may be stopped promptly in case of any engine failure and the drag of the dead propeller on the airplane can be greatly reduced.

The present invention is characterized in that it is more simple than the structures heretofore provided for the same purpose, and provides a larger range of pitch control than unreliable hydraulic elements such as sleeves, valves, and low pressure elements heretofore used, thereby insuring greater reliability, and constant maximum engine horsepower at constant engine speed.

The principal objects of the present invention are to provide a hydraulic mechanism for the purposes described, by which unlimited pitch range and quick feathering can be obtained, for example, when one of the engines must be stopped, due to engine troubles; by which a simple and effective oil circuit is provided between actuating and governing elements; positive, continuous, and instantaneous response of pitch angle to the change in engine speed is effected; the actuating hydraulic means is directly or indirectly actuated by the engine speed; backlash and lost motion of the propeller blades during pitch change are eliminated; positive and continuous torque is provided for regulating the pitch of the propeller blades and for maintaining them in the desired position of power and load equilibrium; and the propeller blades may be completely reversed and pitched to any desired angle in either direction from a normal or neutral position.

Other objects and advantages will become apparent from the following specification wherein reference is made to the drawings in which:

Figure 1 is a diagrammatic illustration of a preferred embodiment of the present invention employing a reversible fluid pressure circuit including a pump, a hydro-motor, and means to control the circuit in response to engine speed change, and with the motor mechanically drivingly connected to the blades of the propeller;

Figures 2 and 3 are diagrammatic front and side elevations, respectively, of the propeller and motor illustrated in Figure 1, the pump being shown diagrammatically in connection therewith for clearness in illustration;

Figure 4 is a longitudinal sectional view of the propeller hub and motor assembly and is taken on a plane indicated by the line 4—4 in Figure 3;

Figure 6 is a cross-sectional view through the variable delivery pump used in connection with the present invention and with a hydraulic servo-motor used in connection therewith;

Figure 6a is an axial sectional view of a stroke adjusting means which may be used at the right-hand side of the pump illustrated in Figure 6 for quick feathering of the propeller;

Figure 7 is an axial sectional view through the propeller drive shaft, illustrating the oil transfer ring and the manner in which the fluid pressure is supplied to the hydraulic motor, the shaft being shown in elevation for clearness in illustration;

Figure 8 is a sectional view taken on a plane indicated by the line 8—8 in Figure 7, the hydraulic circuit being diagrammatically illustrated in connection therewith;

Figure 9 is a sectional view of the propeller hub showing a planetary speed reducing gear connection between the hydro-motor and the propeller blades and is a modification of the structure illustrated in Figures 1 to 8;

Figure 14:
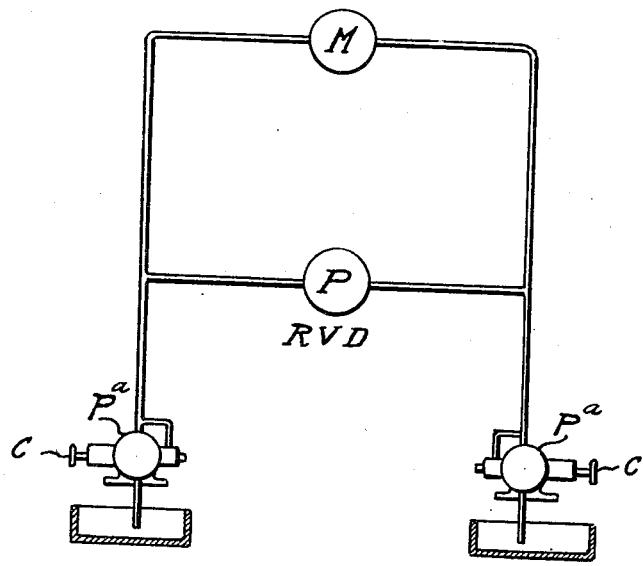
Figure 13:
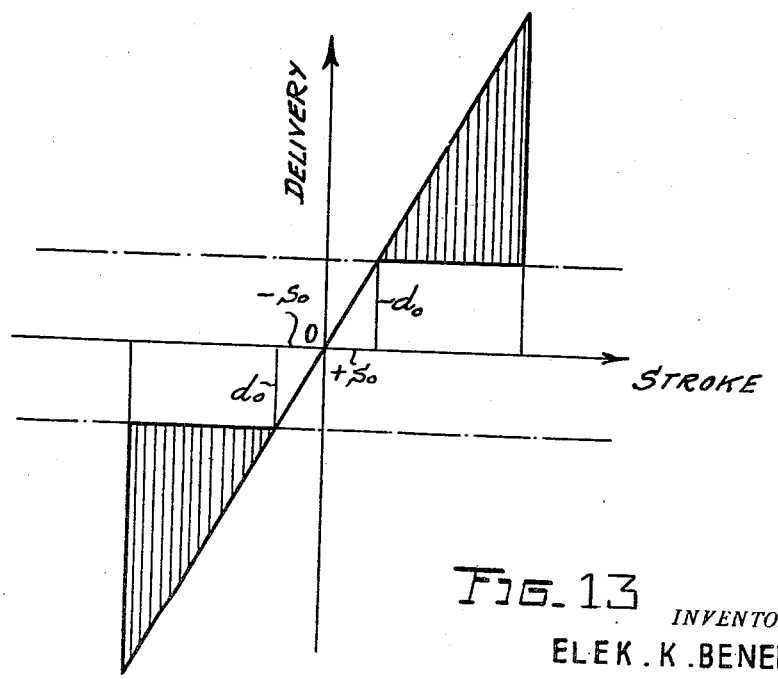

Figures 10 and 11 are sectional views taken on planes indicated by the lines 10—10 and 11—11, respectively, in Figure 9;

Figure 12 is a sectional view taken on the plane indicated by the line 12—12 in Figure 11;

Figure 13 is a graphical representation of the effect of slip in a reversible, variable stroke, high pressure pump;

Figure 14 is a modified circuit employing auxiliary power means for reducing hydraulic backlash; and Figure 15 is a diagrammatic illustration of a circuit similar to Figure 1, but employing a non-reversible pump and constant pressure control with valve means for reversing the flow of the pump with respect to the motor.

Referring first to Figures 1 to 12, inclusive, the invention is embodied in an apparatus wherein the pitch of the propeller blades is changed and set by a single hydro-motor which is coaxial with the hub or rotational axis of the propeller and usually also with the engine crank shaft. The hydraulic elements may comprise a motor 1 which can be reversed by reversal of the delivery of the pump so that the motor shaft may swing through an angle a in either direction from a neutral or normal operating position, as indicated at n in Figure 1. Reversal of the motor may be effected also by suitable valves and a one-way pump, as described hereinafter.

The motor is connected to a variable delivery pump 2 in a circuit comprising pipes 3 and 4 leading from opposite sides of the pump to opposite sides of the motor. The opposite sides of the pump circuit are connected to a sump by pipes 5 and 6, respectively, these pipes being provided with pressure check valves 7 and 8. Oil pressure fluid is supplied to the servo-motor 9 through a suitable pipe 10a from the gear pump 10 of the engine to actuate the servo-motor which is operative to vary or reverse the pump stroke while the pump continues to be driven in the same direction. The pilot valve of the servo-motor, in turn, is connected by a suitable rod 11 to a hand-operated rock lever 12 so that the stroke of the pump may be adjusted or reversed by hand. The rod 11 may be connected also to a lever 13 operated by a governor 14 which, in turn, is driven through appropriate means, such as flexible shaft and gears 15, from the engine of the airplane or vehicle. Thus independent hand and governor control are obtained. The pump 2 is continuously driven from the engine of the airplane or vehicle. Consequently, its delivery may be under the control of the governors 14 at all times and, as a result, the setting of the motor 1 and the pitch of the propeller blades may be controlled in a direct relation to the speed of the engine or prime mover.

The motor 1 is mounted in a rigid housing 16 which forms the propeller hub and forwardly from which extends a portion in which the propeller blades 17 are mounted. The propeller housing 16 and blades are rotated primarily about the propeller axis by the main drive or crank shaft 18 of the engine, the connection between the pump and the motor being effected by means of an oil transfer ring 19.

Figure 5:
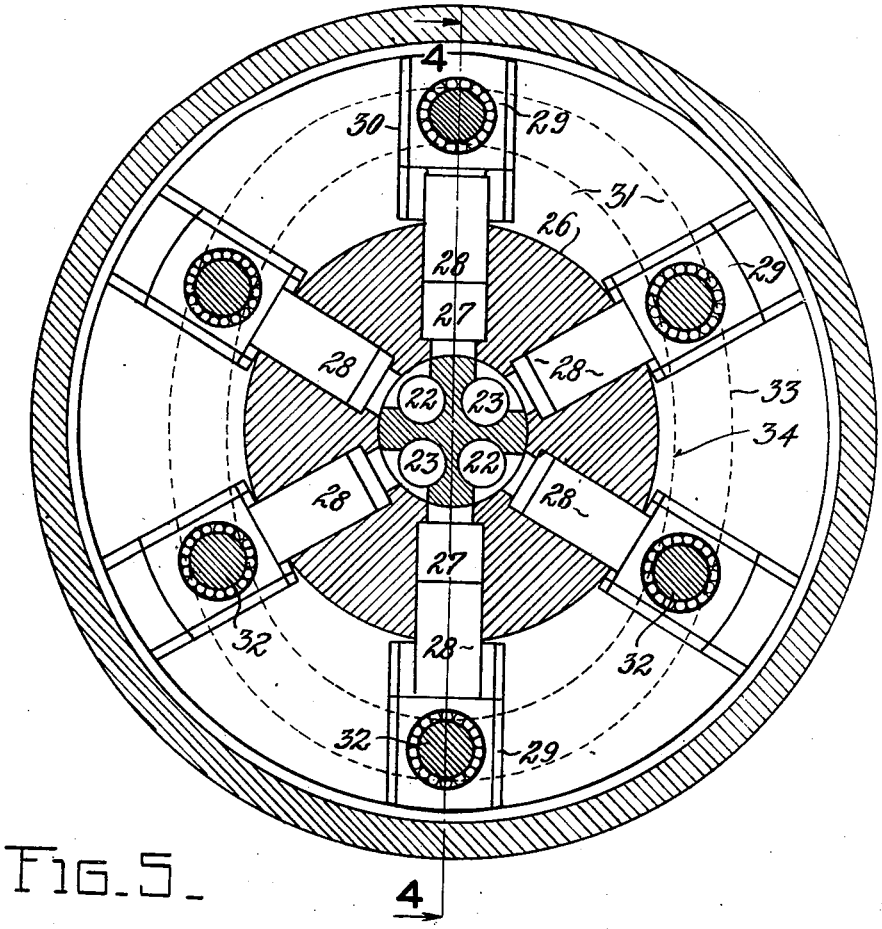
Figure 5 is a sectional view taken on a plane indicated by the line 5—5 in Figure 4.

Referring next to Figures 4 and 5, the housing 16 of the hydro-motor 1 rotates with the propeller or engine shaft 18, the housing 16 being fixedly secured thereto by splines 20. The outer end portion of the shaft 18 is constructed in the form of a valve pintle 21, but this pintle may be made separate and attached to the shaft. The pintle 21 has sets of reversible ports 22 and 23, connected by internal ducts, as illustrated, with reversible ports 24 and 25, respectively, in the shaft 18. Mounted on the pintle 21 for rotation relative thereto is a rotatable barrel 26 having a plurality of radial cylinders 27, each cylinder having a port arranged for successive cooperation with the ports 22 and 23 as the barrel rotates relative to the pintle. Mounted in the cylinders are radial pistons 28, each of which has a head portion 29 guided in suitable guideways 30, in a radial flange 31 on the barrel. Each crosshead 29 carries a cross pin 32 which is rotatable in the cross-head 29 on anti-friction needle rollers. The ends of the cross-pins 32 project beyond the heads 29 and engage a reactance means with which they cooperate for effecting rotation of the barrel when fluid pressure is introduced into the cylinders in the proper valving relation. In the form illustrated, an elliptical hydraulically balanced reactance means is provided and comprises outer cam rings 33 and inner cam rings 34 parallel thereto, these rings forming cam tracks with which the ends of the cross pins 32 are in rolling engagement. Thus the barrel can be caused to rotate relative to the shaft 18. Fixedly secured to the barrel at its outer end and coaxial therewith is a synchronizing bevel gear 35 which cooperates with bevel gears 36 mounted on the inner ends of the hubs of the propeller blades 17. This motor is more fully described in my United States Patent No. 2,111,657, but motors described in my United States Patent No. 2,097,830 or 2,101,731 are equally applicable for this purpose.

The propeller blades 17 have their hubs mounted anti-frictionally in a rigid housing 37 which is rigid with the housing 16 and rotates therewith. Thus, the blades can, through the medium of the bevel gears, be rotated about the axis of their hubs so as to change the pitch of the blades.

The oil transfer ring 19 is arranged for connecting the pump with the motor through the ports 24 and 25, as heretofore described. Thus, by admitting fluid from the pump to the motor, the barrel 26 can be rotated relatively to the propeller shaft or crank shaft 18 and change the setting of the propeller blades and hold the blades in the condition set by controlling the delivery of the pump as hereinafter will be more specifically described. For example, the pressure and delivery of the pump can be increased to move the blades to a predetermined setting and then adjusted so as to supply only slip fluid for maintaining the blades in the set condition. As heretofore explained, this may be accomplished automatically.

The connection between the pump and the motor is better illustrated in Figure 8, which shows the intermediate oil-transfer ring 19 to valve the discharge of the pump into the motor.

Referring next to Figures 6 and 6a, a preferred embodiment of the pump for use in connection with the hydraulic mechanism is illustrated and is the pump more fully described in my United States Patent No. 1,876,833. Other designs such as shown in United States Patents Nos. 2,111,657 or 2,097,830 are equally applicable for this use.

The illustrative pump comprises a valve pintle 40 having reversible valving ports 41 and ducts 42, the ports 41 being pressure or suction ports, depending upon the setting of the shifter ring of the pump. Mounted for rotation about and fitting the pintle is a rotatable barrel 43 having radial cylinders 44 and valve ports 45 arranged for successive cooperation with the ports 41 as the barrel rotates. Mounted in the cylinders are radial reciprocable pistons preferably having T-heads 48 which engage a rotary reactance 49 for reciprocating the pistons consequent upon rotation of the barrel when the reactance is in an eccentric relation to the piston. In the form illustrated, the reactance comprises rings supporting thrust plates 50 which bear against the outer surface of the T-heads 48, respectively, and form with surfaces 51 of the rings chordal slots for slidably accommodating the T-heads. The rotary reactance is carried in a stator 52 which is supported, as indicated at 53, within a casing 54 of the pump. The reactance can be adjusted in a straight line through the median plane of the bridges which are between the pintle valve ports, from a position of eccentricity to one side of the pintle axis to a position of eccentricity at the opposite side. When the reactance is set to one side of the pintle axis, rotation of the pump barrel 43 causes one of the ports 41 to become a pressure port and the other port 41 to become a suction port. Shifting the reactance in the opposite direction from the center position will reverse the pump discharge and flow through the ports 41. For shifting the reactance, the engine driven governor 14 is interconnected with the hydraulic servo-motor 9, as described with reference to Figure 1.

The servo-motor 9 is arranged so that its power cylinder 9a is moved by fluid pressure in a direction opposite to the direction of movement of the pilot plunger 9b. This cooperation of the pilot and power plungers is desirable for feathering, as appears more fully hereinafter.

Referring next to Figure 6a, the servo-motor may be supplemented with a cylinder 60 and a piston 61, one side of the piston being connected by a duct 62 and a pipe line 63, as illustrated in Figure 8, to the pressure side of the main pump 54, as shown in Fig. 8. Thus the stroke can be controlled by the control of pressure introduced from the piston 61 by means of the valve 64. It will be seen from Fig. 8, that cracking valve 64 for the purpose of a sudden or emergency shift of piston and piston rod 61, shown also in Fig. 6 at the right hand side of shifter ring 52, and in Fig. 6a in cylinder 60, will by no means change the chief caracteristics of the operating oil circuit between pump 54 and its connected hydraulic motor, as shown further in Fig. 4. In Fig. 4 the R. V. D. pump and the reversible variable speed motor M as at 16 are shown in a closed hydraulic circuit, wherein to every fixed stroke position of the pump belongs only one fixed speed operation of the hydro-motor, and vice versa; to each speed position of the motor belongs only one stroke position of the pump. In the closed circuit it is also imperative, that in each neutral (zero delivery) position of the pump (R. V. D.) the motor M is locked up in fixed interlocked, braked position by the hydraulic fluid only of the closed hydraulic circuit. Such interlocked closed position of the hydro-motor M, or 16, and the operated blades 17—17 as in Fig. 4, is highly desirable, particularly for the feathering operation of the blades. Both for safety and the character of emergency operation in a feathering, it is vitally important to shift the shifter ring 52 quickly and positively in view of the controlling lack of the governor 14, by the main pressure, into the desired feathering position of the blades. But by operating the servo-motor 9 via the main pressure, by momentarily directing pressure fluid through valve 64 and line 63 into cylinder 60 instead of by using auxiliary fluid of gear pump 10 of Fig. 8, the safety and precision of the operation of the main hydraulic closed circuit is increased in case of an emergency, without impairing any basic feature of it, because after the feathering, valve 64 will be closed again, servo-motor 9 and gear pump 10 will take over the pitch controlling operation of the blades 17—17. In an hydraulic closed circuit, the pump and motor are never independent from one another. They mutually cooperate for safety and efficiency via the practically incompressible hydraulic fluid medium.

Referring next to Figures 9 to 12, a mechanical reduction gearing is used between the shaft of the hydro-motor and the propeller blades for increasing the turning moment of the motor. In this modification, the hydro-motor shaft 70 carries a small gear 71 which is drivingly connected to gears 72, which are connected to a disc 73 having a shaft 74 on which is mounted a bevel gear 75. The bevel gear 75 is drivingly connected to the bevel gears 76 of the respective propeller blades so that reduction is provided between the shaft 70 of the main bevel gear 75. In connection with Figure 11, the propeller blade hub 77 is mounted on elongated cageless needle rollers 78 and thrust bearings 79, for withstanding transverse and centrifugal forces.

Referring next to Figure 13, there is effective slip in the reversible, variable stroke, high pressure pump which causes a so-called hydraulic "back-lash" during the slip stroke $S_0$ in either direction of shift, due to the fact that the slip volume $D_0$ causes only an internal flow which is a loss and not effective as external output. In order to eliminate this hydraulic back-lash from the pump and motor circuit, an auxiliary source of power may be introduced on each side of the circuit, as illustrated on Figure 14, wherein a one-way pump equipped with an automatic pressure control C will maintain a constant pressure on each side of the neutral during reversal of the main pump stroke. The auxiliary pumps $P_a$ are so dimensioned that they may supply the intake fluid of the main pump, and thus the pressure check valves and suction valves may be eliminated.

Referring next to Figure 15, there is illustrated a reversible circuit similar to Figure 1, except that instead of a reversible pump or servo-motor, a one-way pump equipped with a constant pressure control C is used with a four-way valve V for reversing the flow of the motor. The four-way valve V may be directly or indirectly connected to or actuated by a governor. In operation, the control spring of the control C is adjusted so that it counteracts the torsional moment of the propeller blades, in a set position and automatically holds the equilibrium with this torsional moment when the valve is open in a given direction. When the valve V is shifted to reverse the direction of flow for effecting reversal of the motor, the pump automatically holds the blades in that position selected. The pitch is changed by pressure; as soon as the engine speed changes, the pressure increases or decreases and permits the changes of the stroke of the pump by the automatic pressure control to vary the chord angle of the blade according to the new equilibrium. Quick feathering can be obtained by increasing the pressure in this direction to overcome all moments acting on the blades as contrary to a normal cycle; where the counter-moment of torsion holds the propeller against the balancing pressure of the pump at an angle less than 90°. For feathering, the chord of the angle of pitch becomes parallel to the direction of flight. Thus, this circuit arrangement takes advantage of the counter-movement of the blades to reduce the pitch angle, and the hydraulic pressure really acts only to increase the pitch angle in one direction only toward the maximum limit of feathering.

I claim:

1. In a propeller mechanism, a hub, an engine connected to said hub for driving the hub, a plurality of radial blades mounted on the hub for concurrent rotation therewith and for pitch varying movements about their respective radial axes; a closed fluid circuit reversible variable speed hydraulic transmission mechanism including a variable stroke pump operatively interposed between said hub and said blades respectively to rotate said blades in a forward and reverse direction and thereby increase or decrease the working pitch of said blades; stroke varying means including an hydraulic device connected to said pump to change the speed and direction of rotation of pitch varying movements, a speed responsive device drivingly connected to said stroke varying means, means drivingly interconnecting the engine and the speed responsive device, and a source of hydraulic pressure independent of said variable speed transmission connected to said hydraulic device, and a substantially constant speed drive connected to said pump.

2. In a propeller mechanism, a hub, an engine connected to said hub for driving the hub, a plurality of radial blades mounted on the hub for concurrent rotation therewith and for pitch varying movements about their respective radial axes; a closed fluid circuit reversible variable speed hydraulic transmission mechanism including a variable stroke reversible pump and a reversible hydraulic motor operatively interposed between said hub and said blades respectively to rotate said blades in a forward and reverse direction and thereby increase or decrease the working pitch of said blades, stroke reversing means including an hydraulic device connected to said pump to change the speed and direction of rotation of pitch varying movements, a speed responsive device drivingly connected to said stroke reversing means, means drivingly interconnecting the engine and the speed responsive device, and a source of hydraulic pressure independent of said variable speed transmission connected to said hydraulic device to operate the same in response to the movement of said speed responsive device, a fluid supply means for said transmission mechanism, conduit means for connecting said reversible pump with said reversible hydraulic motor in a closed fluid circuit, and valve means for connecting each conduit means selectively with said fluid supply means.

3. In a propeller mechanism, a hub for connection to an engine for driving the hub, a plurality of radial blades mounted on the hub for concurrent rotation therewith and for pitch varying movements about their respective radial axes; hydraulic means including a variable delivery constant speed reversible pump and a reversible hydraulic motor, said pump and said motor being interconnected in a reversible closed fluid circuit and operatively interposed between said hub and said blades respectively to hydraulically interlock said pump with said motor in any adjusted pitch position of the blades; stroke controlling means including an hydraulic device connected to said pump to change the speed and the direction of rotation of said motor and the connected blades respectively, a speed responsive device drivingly connected to said stroke controlling means, means drivingly interconnecting the engine and the speed responsive device, and manually operable means connected to said stroke controlling device for changing the stroke of the pump independently from said speed responsive device.

4. In a propeller mechanism, a hub, an engine including a drive shaft connected to said hub for driving the hub, a plurality of radial blades mounted on the hub for concurrent rotation therewith and for pitch varying movements about their respective radial axes; hydraulic means including a variable delivery constant speed reversible pump and a reversible hydraulic motor, said pump and said motor being operatively interconnected in a reversible closed fluid circuit whereby in any neutral position of the pump the motor and the blades will be hydraulically interlocked in their adjusted position by the pressure of said closed hydraulic circuit; said motor being mounted on said drive shaft and in relative rotation thereto, a housing connected to said hub surrounding said motor and carried by said shaft in rigid relation thereto, fluid transfer means hydraulically connected to said pump surrounding said shaft in stationary relation thereto, fluid passage means in said shaft interconnecting said pump and said fluid transfer means respectively with said motor in a closed hydraulic circuit, a rotary barrel for said motor, cylinders in the barrel, pistons in the cylinders and means connected to the outer end of the pistons for actuating the pistons radially in and out, and means in said housing to receive and actuate last named means, and means to provide driving connection between the cylinder barrel of the motor and the blades of the hub for effecting pitch-varying movement of the blades consequent upon rotation of said barrel relative to said shaft.

5. In a propeller mechanism, a hub, an engine including a drive shaft connected to said hub, a valve pintle formed integrally with said shaft and projecting therefrom, a plurality of radial blades mounted on the hub for concurrent rotation therewith and for pitch varying movements about their respective radial axes; a closed circuit reversible variable speed hydraulic transmission mechanism including a reversible hydraulic motor operatively interposed between said hub and said blades respectively to rotate said blades in a forward and reverse direction and thereby increase or decrease said pitch varying movements, said motor being mounted on said central valve pintle coaxial with the hub and secured thereto to rotate therewith, a cylinder barrel rotatable about said pintle relatively to said hub, housing means carried by and rotatable with said hub and pintle, pistons mounted radially in the cylinder barrel, and connections between the pistons and said housing means, driving connections between said cylinder barrel and said blades for effecting pitch varying movement of the blades upon rotation of said barrel relatively to said pintle, and means for supplying fluid under pressure through said valve pintle to said cylinders.

6. In an hydraulic propeller mechanism including a hub, an engine connected to said hub for driving the hub, a plurality of radial blades mounted on said hub for concurrent rotation therewith and for pitch varying movements about their radial axes; a variable speed reversible hydraulic transmission mechanism including a reversible stroke pump and a reversible stroke motor operatively interposed between said hub and said blades, a fluid supply passage and a fluid return passage respectively connecting said pump and said hydraulic motor in a closed reversible fluid circuit, stroke varying means including an hydraulic device connected to said pump to change the speed and direction of rotation of said motor and of said pitch varying movements respectively, valve means interconnecting said stroke varying means with said supply passage of said pump and motor for shifting the stroke of the pump in response to the opening of said valve means for effecting quick emergency feathering of the blades.

7. In an hydraulic propeller mechanism including a hub, an engine connected to said hub for driving the hub and having a projecting reduced diameter pintle portion, a plurality of radial blades mounted on said hub for concurrent rotation therewith and for pitch varying movements about their radial axes; a variable speed reversible hydraulic transmission mechanism including a pump and a reversible stroke fluid motor operatively interposed between said hub and said blades, a fluid supply passage and a fluid discharge passage respectively connecting said pump with said motor in a closed fluid circuit, said motor including a cylinder barrel rotatable about said pintle relatively to said hub, cylinders in said cylinder barrel, reactance means carried by and rotatable with said hub and pintle, pistons mounted in the cylinders of the barrel, and connections between the pistons and reactance means, driving means fixed to said cylinder barrel and being coaxial with said hub and pintle, mechanical means connecting said driving means with said blades, and fluid transfer means for supplying fluid under pressure through said valve pintle to said cylinders and said motor respectively.

8. In a propeller mechanism including a rotatable propeller shaft, a hub mounted on said shaft for rotation therewith, an engine connected to said shaft for driving the hub, a plurality of radial blades mounted on the hub for concurrent rotation therewith and for pitch varying movements about their respective radial axes; a closed fluid circuit reversible variable speed hydraulic transmission mechanism operatively interposed between said hub and said blades respectively, said transmission mechanism including a reversible delivery constant speed pump and a hydraulic motor, a fluid supply passage, a fluid discharge passage connecting respectively the corresponding sides of the pump and the motor, stroke varying means including a stationary shifter ring connected to said pump, a hydraulic device rigidly connected to said shifter ring to change the volume and the direction of fluid supply of the pump and the speed and direction of said motor and the pitch varying movements respectively, a speed responsive device drivingly connected to said stroke varying means, means drivingly interconnecting the engine and the speed responsive device, and hydraulic means other than said pump connected to said hydraulic device for actuating said stroke varying means and the interconnected shifter ring of the pump.

9. In a propeller mechanism, a hub, an engine connected to said hub for driving the hub, a plurality of radial blades mounted on the hub for concurrent rotation therewith and for pitch varying movements about their respective radial axes; a closed hydraulic circuit reversible hydraulic transmission mechanism operatively interposed between said hub and said blades respectively, said transmission mechanism including a reversible variable delivery pump and a hydraulic motor, speed responsive means driven by the engine, and control means connected to said pump and to said speed responsive means respectively to adjust the strike and therewith the delivery of said pump in response to the variation of the speed of the said engine, said control means including a power cylinder and piston assembly and an auxiliary source of fluid pressure connected to said assembly, a pilot valve for said assembly, a speed responsive device drivingly connected to the pilot valve of said assembly, means drivingly interconnecting the engine and said speed responsive device, and means hydraulically interconnecting said auxiliary source of pressure power with said power piston and cylinder assembly, said power assembly and said pilot valve adjusting the stroke of said pump and the interlocked angular position of said motor and connected blades respectively in response to the shifting of said pilot valve by said speed responsive device.

10. In a propeller mechanism, a hub, an engine connected to said hub for driving the hub, a plurality of radial blades mounted on the hub for concurrent rotation therewith and for pitch varying movements about their respective radial axes; a closed fluid circuit reversible variable speed hydraulic transmission mechanism including a variable delivery radial piston reversible pump and a variable speed radial piston reversible motor and a fluid supply passage and a fluid discharge passage connecting the pump with the motor, all operatively interposed between said hub and said blades, stroke varying means including a hydraulic device connected to said pump to change the speed and direction of rotation of pitch varying movements, a speed responsive device drivingly connected to said stroke varying means, means drivingly interconnecting the engine and the speed responsive device, a source of hydraulic pressure power independent of said variable speed transmission connected to said hydraulic device, and manually operable means connected to said stroke varying means for feathering said blades.

ELEK K. BENEDEK.

REFERENCES CITED

The following references are of record in the file of this patent:

UNITED STATES PATENTS

| Number | Name | Date |
| --- | --- | --- |
| Re. 20,551 | Rouse | Nov. 9, 1937 |
| 1,723,617 | Hele-shaw et al. | Aug. 6, 1929 |
| 1,972,486 | Hoover | Sept. 4, 1934 |
| 2,086,097 | Shoemaker | July 6, 1937 |
| 2,111,657 | Benedek | Mar. 22, 1938 |
| 2,161,917 | Forsyth et al. | June 13, 1939 |
| 2,296,348 | Hoover | May 31, 1939 |
| 2,307,849 | Mullen | Jan. 12, 1943 |
| 2,392,364 | Caldwell et al. | Jan. 8, 1946 |
| 2,422,966 | Hoover | June 24, 1947 |

FOREIGN PATENTS

| Number | Country | Date |
| --- | --- | --- |
| 479,888 | Great Britain | Feb. 14, 1938 |